(12) United States Patent
Purushothaman

(10) Patent No.: US 10,491,468 B2
(45) Date of Patent: Nov. 26, 2019

(54) DYNAMIC SERVER ALLOCATION FOR AUTOMATED SERVER BUILDS

(71) Applicant: Bank of America Corporation, Charlotte, NC (US)

(72) Inventor: Sasidhar Purushothaman, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 107 days.

(21) Appl. No.: 15/810,372

(22) Filed: Nov. 13, 2017

(65) Prior Publication Data

US 2019/0149403 A1 May 16, 2019

(51) Int. Cl.
| | | |
|---|---|---|
| G06F 9/50 | (2006.01) | |
| H04L 12/24 | (2006.01) | |
| G06F 8/61 | (2018.01) | |
| H04L 12/911 | (2013.01) | |
| G06F 11/14 | (2006.01) | |

(52) U.S. Cl.
CPC ............ *H04L 41/0806* (2013.01); *G06F 8/61* (2013.01); *G06F 9/5027* (2013.01); *G06F 9/5055* (2013.01); *G06F 11/1405* (2013.01); *H04L 47/82* (2013.01); *G06F 2201/805* (2013.01); *G06F 2201/85* (2013.01); *G06F 2209/503* (2013.01); *H04L 41/0813* (2013.01); *H04L 41/0823* (2013.01); *H04L 41/50* (2013.01); *H04L 41/5029* (2013.01); *H04L 41/5051* (2013.01)

(58) Field of Classification Search
CPC ........ G06F 8/61; G06F 9/5027; G06F 9/5055; G06F 9/45558; G06F 9/45533; H04L 41/0806; H04L 41/0813; H04L 41/0826; H04L 41/0823; H04L 41/50; H04L 41/5012; H04L 41/5016; H04L 41/5029; H04L 41/5041; H04L 41/5051; H04L 41/5054; H04L 67/20

See application file for complete search history.

(56) References Cited

U.S. PATENT DOCUMENTS

| | | | |
|---|---|---|---|
| 6,282,711 B1 * | 8/2001 | Halpern | G06F 8/61 |
| | | | 709/203 |
| 6,760,903 B1 | 7/2004 | Morshed et al. | |
| 7,062,755 B2 | 6/2006 | Partamian et al. | |

(Continued)

*Primary Examiner* — Joseph O Schell
(74) *Attorney, Agent, or Firm* — Weiss & Arons LLP; Michael A. Springs, Esq.

(57) ABSTRACT

Systems and methods for dynamically allocating a plurality of servers for use in a server build process is provided. The system may include a receiver module configured to receive at least one server build request including a requested time interval. The system may include an analysis module configured to determine if the requested time interval is greater than or less than a pre-determined threshold value and an availability status of each of the servers. The system may include a selection module configured to select a server configuration type. The server configuration type may be based on the determination of the requested time interval being greater than or less than the pre-determined threshold value. The configuration types may be selected from a group of pre-determined configuration types being one of a minimal server type, a tolerant server type and an optimal server type.

11 Claims, 2 Drawing Sheets

(56) References Cited

U.S. PATENT DOCUMENTS

| | | |
|---|---|---|
| 9,329,982 B2 | 5/2016 | Arif et al. |
| 9,367,427 B2 | 6/2016 | Andre et al. |
| 9,436,589 B2 | 9/2016 | Li et al. |
| 9,575,874 B2 | 2/2017 | Gautallin et al. |
| 9,658,936 B2 | 5/2017 | Krajec et al. |
| 9,665,474 B2 | 5/2017 | Li et al. |
| 2004/0133665 A1* | 7/2004 | Deboer ................ G06F 9/5055 709/221 |
| 2013/0042234 A1* | 2/2013 | DeLuca ............. G06F 9/45558 718/1 |
| 2013/0111034 A1* | 5/2013 | Upadhya ............... G06F 3/0605 709/226 |
| 2015/0128121 A1* | 5/2015 | Garcia ...................... G06F 8/65 717/170 |

\* cited by examiner

DYNAMIC SERVER ALLOCATION FOR AUTOMATED SERVER BUILDS

FIELD OF TECHNOLOGY

Aspects of the invention relate to systems and methods for server builds. Specifically, the invention relates to dynamically allocating a plurality of servers for executing a plurality of server build requests.

BACKGROUND OF THE DISCLOSURE

Individuals, small corporations, and large corporations all may have the need for the building of one or more servers for use in their business. Typically, at the start of a business, or when a new project is planned for future use, a server can be built to perfection with all functions and software included. This is the most optimal choice.

However, in certain instances, a business may need a single server or numerous servers built in a short amount of time. This may necessitate the server or servers to be built with the minimal amount of functions and software enabling the server to perform.

In other instances, multiple requests for server builds may occur all at the same time. Each request will have different requirements and may differ in configuration-type.

It would be desirable, therefore, to have systems and methods for dynamically allocating a plurality of servers for executing a plurality of server build requests.

SUMMARY OF THE DISCLOSURE

A system for dynamically allocating a plurality of servers for executing a server build request in a server build process is provided. The system may include a receiver module. The receiver module may be configured to receive a server build request. The server build request may include a requested time interval.

The system may further include an analysis module. The analysis module may be configured to determine if the requested time interval is greater than a pre-determined threshold value or less than a pre-determined threshold value. The pre-determined threshold value may be a default value initially set and may be modified at a later time. The pre-determined threshold value may be user selected prior to setup.

The analysis module may be configured to determine if the requested time interval is less than the pre-determined threshold value. The analysis module may be further configured to retrieve an availability status of each of the plurality of servers. The availability status may be a real-time status of the servers.

The requested time interval may be determined to be greater than the pre-determined threshold value. The requested time interval may be undefined. If the time interval is greater than the pre-determined threshold value, the system may further include a selection module configured to select a first server configuration type for fulfillment of the request. The first server configuration type may correspond to an optimal server configuration type.

When the requested time interval is undefined, the selection module may be configured to similarly select the first server configuration type for fulfillment of the request.

The system may also include retrieving, from the database, a first set of software modules and a first set of computer scripts associated with the request. The first set of software modules may include all software modules and computer scripts that are essential for the request and may enable the servers to be built to its optimum level. The optimal server configuration type may enable the server to be built for fulfillment of the request to its entirety. The optimal server type may be configured to include all the software modules that are both required and not required. Software modules that are not required may be useful and may be helpful for fulfillment of the request but may not be necessary.

When the requested time interval is determined to be less than the pre-determined threshold value, the system may further include the selection module configured to select a second server configuration type for fulfillment of the request. The second server configuration type may correspond to a minimal server configuration type.

The system may additionally include retrieving, from the database, a second set of software modules associated with the request. The second set of software modules may be a subset of software modules that are most essential for fulfillment of the request.

The system may further include retrieving, from the database, a second set of computer scripts associated with the request. The second set of computer scripts may be a subset of computer scripts that are most essential to be executed for fulfillment of the request. The minimal server configuration type may be configured to include the minimum amount of software modules and computer scripts required to enable fulfillment of the request within the requested time interval. The requested time interval may be a quick turnaround time. The turnaround time may be the highest priority in a first server configuration type.

In certain embodiments, the pre-determined threshold value may be a first threshold value. When the requested time interval is greater than the first threshold value and less than a second pre-determined threshold value, the selection module may be further configured to select a third server configuration type. The selection module may be further configured to retrieve, from the database, a third set of software modules associated with the request. The third set of software modules may include an amount of software modules less than the amount of software modules included in the first set, and greater than the amount of software modules included in the second set of software modules. The selection module may be further configured to retrieve, from the database, a third set of computer scripts associated with the request. The third set of computer scripts may include an amount of computer scripts less than the amount of computer scripts included in the first set of computer scripts, and greater than the amount of computer scripts included in the second set of computer scripts.

The system may further include a fulfillment module. The fulfillment module may be configured to allocate the request to the one or more servers determined to be available by the analysis module. The allocation of the request may further be based on an amount of disk space available on the server for installing the selected software modules and an amount of memory available on the server for the execution of the selected computer scripts.

The fulfillment module may further be configured to build the one or more servers. The building may comprise installing the selected software modules. The building may further comprise executing the selected computer scripts.

A failure may occur while installing the selected software modules. A failure may occur during execution of the computer scripts. When a failure occurs, the fulfillment module may be further configured to pause the building at an execution stage where the failure occurred. The execution stage may be among a plurality of execution stages. Each of the plurality of execution stages may be divided into a plurality of steps.

When the building is paused, the fulfillment module may be further configured to determine a failed step within the execution stage. When the failed step is determined, the fulfillment module may be further configured to repeat building at the failed step, or at a prior step. The prior step may be selected based on an analysis of prior steps affected by the failed step.

Each of the execution stages may include an executable code module. Each of the executable code modules may be divided into a plurality of executable code module components. Additionally, each of the plurality of steps may correspond to at least one of the plurality of executable module components.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
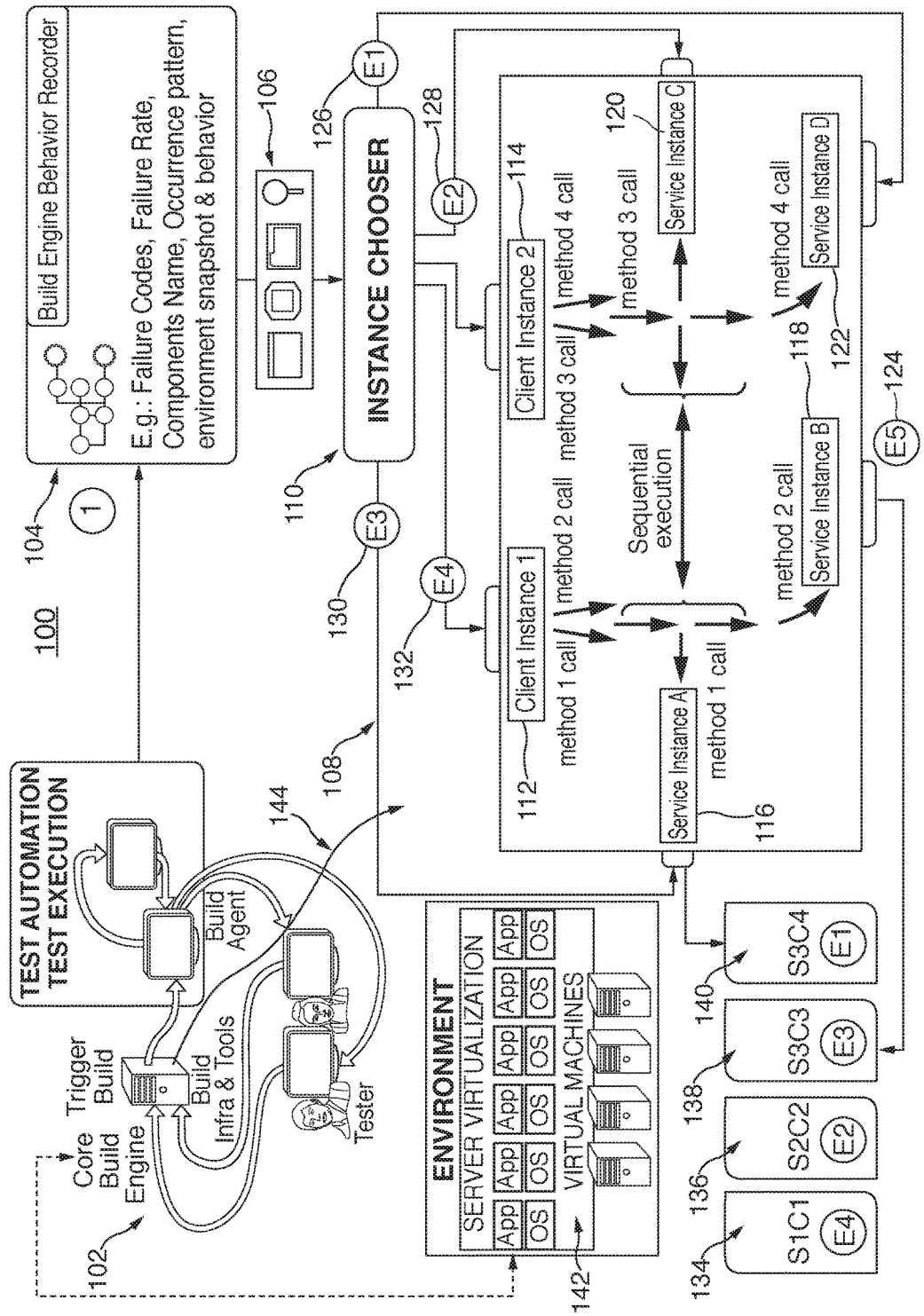
FIG. 1 shows an illustrative diagram in accordance with principles of the invention.

A method for dynamically allocating a plurality of servers for use in a server build process is provided. The method may include receiving the server build request. The server build request may include a requested time interval.

Upon receipt of the server build request, the method may include determining if the requested time interval is greater than or less than a pre-determined threshold value. The method may further include determining an availability status of each of the plurality of servers.

When the requested time interval is determined to be greater than the pre-determined threshold value, the method may include selecting a first server configuration type. The first server configuration type may correspond to an optimal server configuration type. The method may further include retrieving, from a database, a first set of software modules and a first set of computer scripts associated with the request.

When the requested time interval is determined to be less than the pre-determined threshold value, the method may include selecting a second server configuration type. The second server configuration type may correspond to a minimal server configuration type. The method may further include retrieving, from the database, a second set of software modules associated with the request. The second set of software modules may be a subset of the first set of software modules. The method may further include retrieving, from the database, a second set of computer scripts associated with the request. The second set of computer scripts may be a subset of the first set of computer scripts.

The method may further include allocating the request to the one or more servers determined to be available. The allocating may further include determining an amount of disk space available on the server for installing the selected software modules and an amount of memory available on the server for the execution of the selected computer scripts.

In certain embodiments, the pre-determined threshold value may be a first threshold value. When the requested time interval is greater than the first threshold value and less than a second pre-determined threshold value, the method may further comprise selecting a third server configuration type. The selecting may further include retrieving, from the database, a third set of software modules associated with the request. The third set of software modules may include an amount of software modules less than the amount of software modules included in the first set, and greater than the amount of software modules included in the second set of software modules. The selecting may further include retrieving, from the database, a third set of computer scripts associated with the request. The third set of computer scripts may include an amount of computer scripts less than the amount of computer scripts included in the first set of computer scripts, and greater than the amount of computer scripts included in the second set of computer scripts.

The method may also include building the one or more servers. The building may comprise installing the selected software modules and executing the selected computer scripts on the one or more servers for fulfillment of the request.

In another embodiment, a method for dynamically allocating a plurality of server build requests to a plurality of servers is provided. The method may include receiving the plurality of server build requests. Each of the requests may include a requested time interval. The method may also include determining, for each of the plurality of requests, if the requested time interval is greater than or less than a pre-determined threshold value. The method may further determine a number of servers necessary for fulfillment of the request. The method may further determine an availability status of each of the plurality of servers.

If the requested time interval is determined to be greater than the pre-determined threshold value, the method may include selecting a first server configuration type for the request. The first server configuration type may correspond to an optimal server configuration type. The method may also include retrieving, from a database, a first set of software modules and a first set of computer scripts associated with the request.

Additionally, if the requested time interval is determined to be less than the pre-determined threshold value, the method may include selecting a second server configuration type for the request. The second server configuration type may correspond to a minimal server configuration type. The method may further include retrieving, from the database, a second set of software modules associated with the request. The second set of software modules may be a subset of the first set of software modules. The retrieving may in addition include, retrieving from the database, a second set of computer scripts associated with the request. The second set of computer scripts may be a subset of the first set of computer scripts.

The method may further determine an amount of disk space necessary for installing the selected software modules and an amount of memory necessary for executing the selected computer scripts.

If the requested time interval is determined to be equal to the pre-determined threshold value, the method may further include selecting the first server configuration type for fulfillment of the request. In certain embodiments, the method may include selecting the second server configuration type for fulfillment of the request.

When the number of determined available servers are equal to or greater than the number of servers necessary for fulfillment of each of the requests the method may further include building, simultaneously, the plurality of servers for fulfillment of the plurality of requests.

When the number of determined available servers are less than the number of servers necessary for fulfillment of each of the requests, the method may further include initially building the servers for fulfillment of the second server configuration type requests. Subsequently, the method may also include building the servers for fulfillment of the first server configuration type requests.

For each of the requests, the building may further include installing the selected software modules and executing the selected computer scripts.

An exemplary pre-determined threshold value may be twenty minutes. An exemplary pre-determined threshold value may be two hours. When there are a plurality of requests where each request is below the pre-determined threshold value, the threshold value may be adjusted in order to fulfill all the requests.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of the methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method or another method described herein.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram 100 illustrating a system for the dynamic allocation of servers in order to respond to server build requests. The server build requests may form a part of a server build process. Core build engine 102 may be a visual depiction of the overall server build process. Core build engine 102 depicts the setup of the build engine for a server build process. Core build engine 102 encompasses multiple components of the server build process. This may include server instance creation components, a build agent, communicating mechanisms, tools and testing automation models and/or any other suitable components.

System 100 may also include build engine behavior recorder 104. Build engine behavior recorder 104 may be a machine learning module. Build engine behavior recorder 104 may be enabled to learn different behaviors of the servers. Build engine behavior recorder 104 may record metadata and behavior patterns of each of the plurality of servers during the execution stages of the server build process. Metadata recorded during the server build process may include failure codes associated with failures 106 occurring during the server build process.

Metadata recorded may include the rate of the failures 106. Failure rate may include how often the failure is occurring. Metadata recorded may include component names. These component names may correspond to the component in which one or more of the failures 106 occurred.

The behavior patterns recorded may include a snapshot of the server build environment. The snapshot may assist in the prevention of a similar failure occurring during the server build process.

Behavior patterns recorded may include the occurrence pattern for each of the failures 106. The occurrence pattern may include the location where the failure occurred. The location may be a step and/or stage during the server build process where execution failed. The occurrence pattern may include the time that each failure 106 occurred. Behavior patterns recorded may include the behavior of the server during the server build process.

Build engine behavior recorder 104 may enable new action codes to be generated based on previous recorded behaviors. The action codes may be necessary to invoke when execution fails. The action codes may be executed on one of the servers where one or more of the failures 106 occurred. The action codes may be invoked to repair the one or more failures 106.

System 100 may also include server build diagram 108. Server build diagram 108 may illustrate an example of a plurality of requests being dynamically allocated to the available servers for fulfillment of the server build request.

Execution request one ("E1") as shown at 126, may exemplify a first server build request. Execution request two ("E2") as shown at 128, may exemplify a second server build request. Execution request three ("E3") as shown at 130, may exemplify a third server build request. Execution request four ("E4") as shown at 132, may exemplify a fourth server build request. Execution request E3 and E4 may be initiated from a first client 112. Execution request E1 and E2 may be initiated from a second client 114. Server instance A at 116, server instance B at 118, server instance C at 120 and server instance D at 122 may be the available servers being allocated to the server build requests E1-E4.

Instance chooser 110 may assist in allocating the requests E1-E4 to the servers 116-122. Instance chooser 110 may be in connection with core build engine 102 for allocating and building the servers as shown at workflow arrow 144. When one or more server build requests E1-E4 are received, instance chooser 110 may be in connection with engine 102 for selecting and assigning the appropriate selections of configurations to the servers. Workflow arrow 144 may indicate the engine's workflow. Engine 102 may select the appropriate software and computer scripts for the requests E1-E4 and pass them to instance chooser 110. Engine 102 may make the selections based on behavior patterns associated with previous server build processes recorded at build engine behavior recorder 104.

Instance chooser 110 may allocate the requests E1-E4 based on required software and the required computer scripts received from engine 102 for each of the requests E1-E4. Instance chooser 110 may be further configured to determine the level of urgency for the completion of each of the requests. Instance chooser 110 may further be configured to determine the available space on each of the servers 116-122.

For example, server build request E3 may be a request for the building of a server associated with a large project. The project may require numerous software modules and computer scripts to be executed on the server. The project may be urgent and require a quick turnaround. Instance chooser 110 may determine the server space necessary for the software and computer scripts, and find the server that is readily available and has disk space large enough to handle the request. In this example, instance chooser 110 selected server A at 116 for handling the request. Server A may have been the most compatible server for this request. Because the level of urgency for completion of the request is high, the server may be built using a minimal-type of server build. The system may only process building the server with the minimal software and required computer scripts.

In another example, server build request E1 at 126 may be a request for the building of a server associated with either a simple or complex project. There may not be a specified due date and may therefore not be urgent and completed at a later date. Instance chooser 110 may then enable request E3, which is urgent, to be completed on a minimal level, prior to the fulfillment of request E1. Instance chooser 110, in this example, selected server D at 122 to fulfill request E1. Server D may be unavailable at the time of receipt of request E1. Instance chooser 110 may choose to hold the request until server D becomes available. Furthermore, since the level of urgency is not high, the level of complexity of the project may not affect the server being built to perfection. As a result, the server may be built at an optimum level. The optimum level may include, building the server with all the necessary software and computer scripts.

In yet another example, server build request E2 at 120 may be a request for building a server that may have an approaching due date enabling the request to be completed at a tolerant level. In this example, instance chooser 110 selected server C at 120 for handling the request. Server C may be able to handle the request and complete the request by the time it is due. Since there is an approaching due date, building the server at a tolerant level may enable the server to be built to include, at least most of the software modules and computer scripts. Instance chooser 110 may be enabled to determine the software and computer scripts that are more necessary. Instance chooser 110 may be enabled to determine the software and computer scripts that are less necessary. Based on the time interval of the approaching due date, the server may be built at a medium, more tolerant level and may include, at least most of the software modules and computer scripts.

The association of the servers and the server build requests may be seen at servers 134-140. Server 134 may be assigned E4. E4 may have been determined, by the Instance Chooser 110 to be built using Setup 1 Configuration 1 ("S1C1"). S1C1 may include a first set of selected software modules and a first set of computer scripts. Server 136 may be assigned E2. E2 may have been determined, by the Instance Chooser 110 to be built using Setup 2 Configuration 2 ("S2C2"). S2C2 may include a second set of selected software modules and a second set of computer scripts. Server 138 may be assigned E3. E3 may have been determined, by the instance chooser 110, to be build using Setup 3 Configuration 3 ("S3C3"). S3C3 may include a third set of selected software modules and a third set of computer scripts. Server 140 may be assigned E4. E4 may have been determined, by the instance chooser 110, to be built using Setup 4 Configuration 4 ("S4C4"). S4C4 may include a fourth set of selected software modules and a fourth set of computer scripts. E5 at 124 may be similar to request E3 and may use the same setup and configuration as E3.

Environment 142 may be a visual depiction of a plurality of servers that may be allocated in connection with the server build. The servers may be virtual servers. The servers may be dedicated servers.

Figure 2:
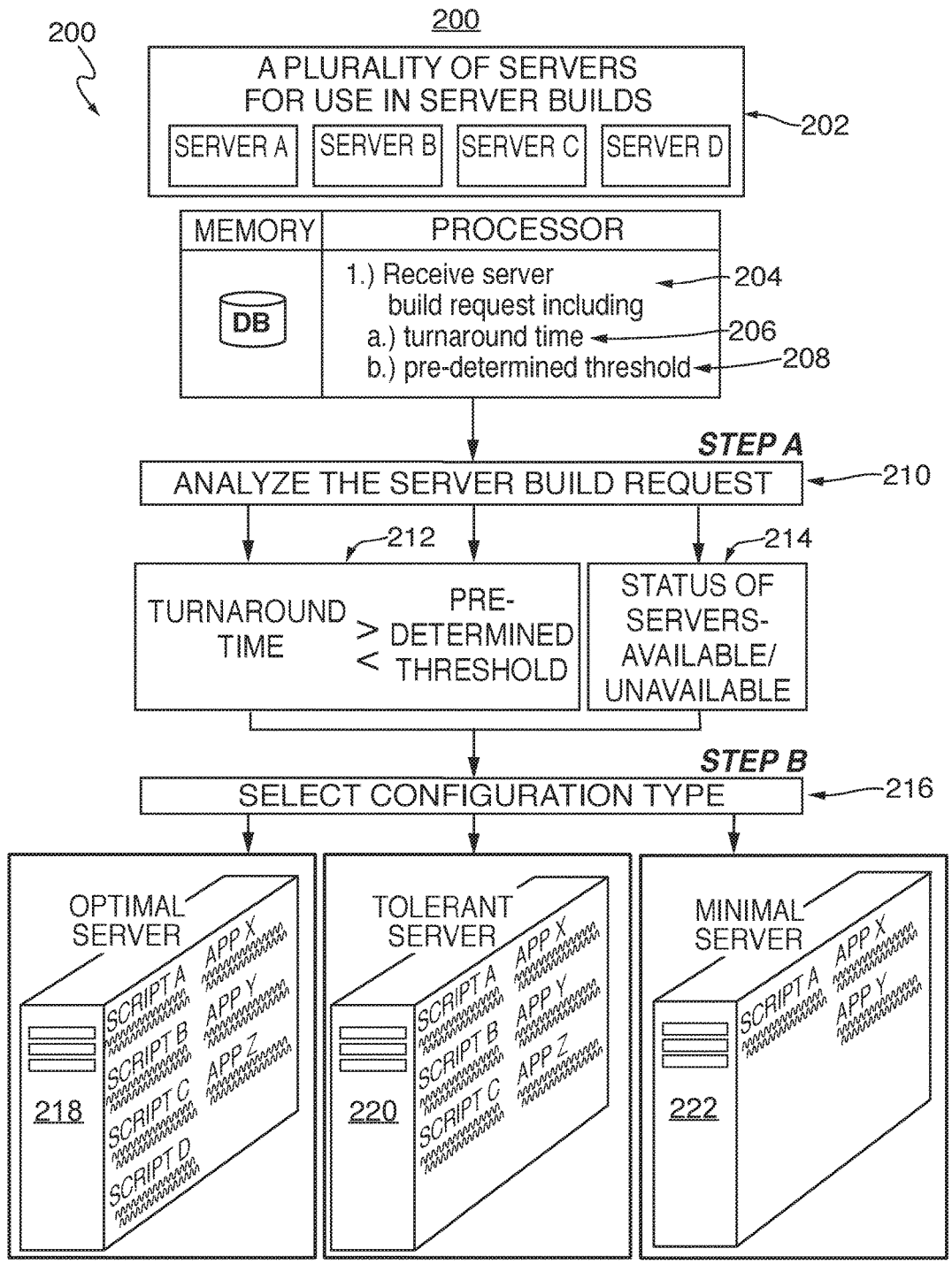
FIG. 2 shows another illustrative process in accordance with principles of the invention.

FIG. 2 shows an illustrative process 200 for the allocation of a server build request to an available server based on the determination of specific requirements. The illustrative process 200 may include one or more of steps 202-216.

Processor 204 may be configured to receive a server build request. It should be appreciated that the processor may be configured to receive more than one request at a time. The server build request may include the turnaround time 206 and a pre-determined threshold value 208. Turnaround time 206 may be evaluated against the pre-determined threshold.

The server build request 204 may be analyzed at step 210. The analysis at step 210 may include steps 212 and 214. Turnaround time 206 may be compared to pre-determined threshold 208 at step 212. The analysis may determine whether the turnaround time 206 is greater than, less than, or within the pre-determined threshold. Step 214 may determine the status of the plurality of servers 202. All of the servers may be available at the time the request is received. There may be one or more servers determined to be unavailable at the time the request is received.

The selection of the server configuration type may be selected at step 216. Step 216 may be configured to select one of server configuration types 218, 220, and 222. The selection may be determined based on the analysis at step 212 and 214.

Optimal server 220 may be selected as the server configuration type when the turnaround time 206 is greater than the pre-determined threshold value 208. Optimal server 220 may be selected when the turnaround time 206 is not defined at the time the request was received. Optimal server 220 may include all the software modules and computer scripts that are both required and not required. Software modules and computer scripts that are not required and are not necessary, may be useful and beneficial for fulfillment of the request to its optimum level.

Tolerant server 222 may be selected as the server configuration type when the turnaround time 206 is within the pre-determined threshold value 208. Tolerant server 222 may include at least the software modules and computer scripts required and at least most of the software modules and computer scripts that are not required but may be helpful for fulfillment of the request. Minimal server 224 may be selected as the server configuration type when the turnaround time 206 is greater than the pre-determined threshold value 224. Minimal server 224 may include the minimum amount of software modules and computer scripts required to enable fulfillment of the request within the turnaround time.

The request received at 204 may be allocated to one or more of the plurality of servers shown at 202 based on the server configuration type and the availability of the servers 202.

Thus, methods and apparatus for allocating a plurality of servers for executing a plurality of server build requests in a server build process have been provided. Persons skilled in the art will appreciate that the present invention can be practiced by other than the described embodiments, which are presented for purposes of illustration rather than of limitation. The present invention is limited only by the claims that follow.

What is claimed is:

1. A method for dynamically allocating a plurality of servers for executing a server build request, the method comprising:
receiving the server build request, the server build request including a requested time interval;
determining, upon receipt of the server build request:
if the requested time interval is greater than or less than a pre-determined threshold value; and
an availability status of each of the plurality of servers;
when the requested time interval is determined to be greater than the pre-determined threshold value:
selecting a first server configuration type; and
retrieving, from a database, a first set of software modules and a first set of computer scripts associated with the request;
when the requested time interval is determined to be less than the pre-determined threshold value:
selecting a second server configuration type;
retrieving, from the database, a second set of software modules associated with the request, the second set of software modules being a subset of the first set of software modules; and
retrieving, from the database, a second set of computer scripts associated with the request, the second set of computer scripts being a subset of the first set of computer scripts;
allocating the request to the at least one or more servers determined to be available; and
building the one or more servers, the building comprising:
installing the selected software modules; and
executing the selected computer scripts.

2. The method of claim 1 wherein the first server configuration type corresponds to an optimal server configuration type.

3. The method of claim 1 wherein the second server configuration type corresponds to a minimal server configuration type.

4. The method of claim 1 wherein the allocation of the request to the at least one of the plurality of servers is further based on:
an amount of disk space available on the server for installing the selected software modules; and
an amount of memory available on the server for the execution of the selected computer scripts.

5. A method for dynamically allocating a plurality of server build requests to a plurality of servers, the method comprising:
receiving the plurality of server build requests, each of the requests including a requested time interval;
determining, for each of the plurality of requests:
if the requested time interval is greater than or less than a pre-determined threshold value; and
a number of servers necessary for fulfillment of the request;
determining an availability status of each of the plurality of servers;
when the requested time interval is determined to be greater than the pre-determined threshold value:
selecting a first server configuration type for the request; and
retrieving, from a database, a first set of software modules and a first set of computer scripts associated with the request;
when the requested time interval is determined to be less than the pre-determined threshold value:
selecting a second server configuration type for the request;
retrieving, from the database, a second set of software modules associated with the request, the second set of software modules being a subset of the first set of software modules; and
retrieving, from the database, a second set of computer scripts associated with the request, the second set of computer scripts being a subset of the first set of computer scripts;
wherein:
when the number of determined available servers are equal to or greater than the number of servers necessary for fulfillment of each of the requests, the method further comprising building, simultaneously, the plurality of servers for fulfillment of the plurality of requests;
when the number of determined available servers are less than the number of servers necessary for fulfillment of each of the requests, the method further comprising:
building, initially, the servers for fulfillment of the second server configuration type requests; and
building, subsequently, the servers for fulfillment of the first server configuration type requests.

6. The method of claim 5 wherein the first server configuration type corresponds to an optimal server configuration type.

7. The method of claim 5 wherein the second server configuration type corresponds to a tolerant server configuration type.

8. The method of claim 5 wherein when the requested time interval is determined to be equal to the pre-determined threshold value, selecting the first server configuration type for fulfillment of the request.

9. The method of claim 5 wherein when the requested time interval is determined to be equal to the pre-determined threshold value, selecting the second server configuration type for fulfillment of the request.

10. The method of claim 5 wherein, for each of the requests the building further comprises:
installing the selected software modules; and
executing the selected computer scripts.

11. The method of claim 5 further comprising determining, for fulfillment of each of the requests:
an amount of disk space necessary for installing the selected software modules; and
an amount of memory necessary for executing the selected computer scripts.

* * * * *